Nov. 21, 1967   J. H. CYPHER   3,353,945
APPARATUS FOR SUPPORTING A GLASS SHEET IN AN UPRIGHT
POSITION FOR HEAT TREATING
Filed Oct. 30, 1964   3 Sheets-Sheet 2

INVENTOR.
JAMES H. CYPHER
BY Chisholm and Spencer
ATTORNEYS

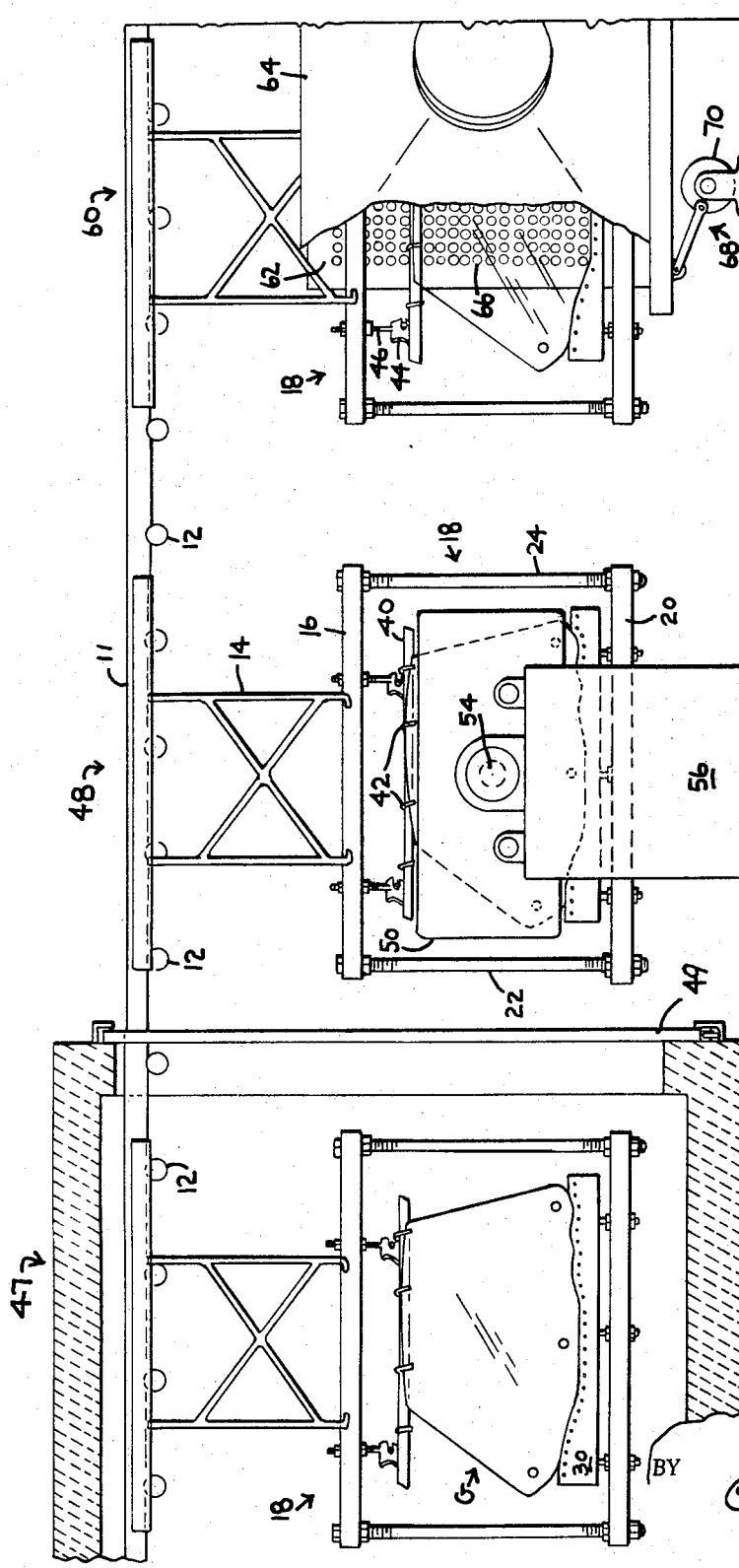

United States Patent Office
3,353,945
Patented Nov. 21, 1967

3,353,945
APPARATUS FOR SUPPORTING A GLASS SHEET IN AN UPRIGHT POSITION FOR HEAT TREATING
James H. Cypher, New Kensington, Pa., assignor to Pittsburgh Plate Glass Company, Pittsburgh, Pa., a corporation of Pennsylvania
Filed Oct. 30, 1964, Ser. No. 407,766
6 Claims. (Cl. 65—273)

ABSTRACT OF THE DISCLOSURE

Apparatus for supporting the bottom edge of a glass sheet, particularly one having a non-linear bottom edge, comprising a series of spaced, flat, flexible fingers having an attached edge and a free edge. The fingers are alternately attached to opposite elongated wall members and extend toward the unattached wall member at least half the transverse distance between wall members and may have their unattached end slidably supported on the upper edge surface of the other wall member.

---

The present invention relates to sheet support apparatus, specifically apparatus for supporting glass sheets for thermal treatment, and patricularly relates to suport a glass sheet having a nonlinear edge which forms the longest edge of the glass during a thermal operation wherein the glass is heat treated for heat strengthening. Such shapes are required for present-day automotive sidelights to provide clearance for cranking mechanism. In addition, such sidelights are apertured near their longest edge to receive actuating rods to raise and lower them relative to the automobile doors in which they are mounted. Such apertures tend to weaken the glass.

Glass sheets have been thermally treated by conveyance first through a furnace and then through a cooling operation with or without intermediate shaping operations while supported in a horizontal or a vertical or an oblique plane. Expensive equipment is available to support glass sheets vertically. Use of such equipment in the past has been limited to tong-gripping apparatus that grips glass sheets at its upper edge portion and apparatus that supports glass having a straight edge for support in an upright position. The present invention renders expensive equipment which is still in operating condition capable of supporting glass sheets along a nonlinear edge in an upright position.

The object of the present invention is to provide improvements in apparatus for heat treating glass sheets supported vertically. In such apparatus, tunnel-like furnaces have spaces that are longer in their vertical than in their horizontal dimension for receiving and conveying glass sheets in a horizontal path of travel. In the past, such furnaces have been used with tong-gripping means for suspending glass sheets vertically during their movement through the furnace and through subsequent glass-treating apparatus. Tong gripping produces indentations in the regions of gripping and also tends to stress the glass locally in the vicinity of the tong-gripping elements. This induces fracture in the glass.

In order to avoid the marring of the optical properties—resulting from the use of tongs, the glass industry has developed devices for supporting the glass in a vertical or substantially vertical position involving supporting the bottom edge and balancing the sheet vertically. The latter may be accomplished by loosely engaging the side or top edge with balancing members that support the glass in either a vertical plane or one making only a small angle to the vertical plane. Such devices in the past have been suitable for glass sheets having straight bottom edges. The present invention makes it possible to support glass sheets having nonlinear elongated edges along said edges for thermal treatment.

In addition, it is necessary to drill holes in automobile sidelights near their longest dimension. This increases the requirement for strength along and adjacent the longest glass edge. Glass is stronger and more resistant to breakage when stressed in compression and weaker when stressed in tension. Any heat absorbing member in the vicinity of a glass edge tends to reduce the natural compressive edge stress and may also increase the composite tension stress measured through the glass thickness adjacent its supported edge. The present invention provides less of this effect on the supported glass edge than prior art supports, thus increasing its edge strength.

In summary, the present invention comprises apparatus for supporting a rigid sheet in a substantially vertical plane comprising a pair of rigid, elongated vertical wall members spaced transversely from one another along their length. Each of said elongated wall members has an upper edge surface conforming to the shape of the supported bottom edge of the glass sheet. A set of flexible fingers is attached at one end to at least one of the wall members, while another set of flexible fingers may be attached to the other wall member. Each flexible finger has an unattached end and extends more than half the transverse distance toward the other wall member from the one to which its end is attached. The overlapping portion of the flexible fingers provides a series of flat, spaced, flexible supports for the bottom edge of a glass sheet supported for thermal treatment. The spacing between adjacent flexible supports is such as to provide at least 20 percent but no more than 60 percent clear space along the length of the supported glass bottom edge.

The flexibility of the individual support fingers enables them to conform to the shape of the bottom edge of the glass sheet even when the bottom edge deviates slightly from exact curvature. This ability to deform insures that the fingers support the bottom edge of the glass sheet over substantially its entire length at closely spaced points with sufficient clearance between adjacent supports to allow the bottom edge to cool upon exposure of the sheet to cold air blasts while so supported. The plurality of spaced supports provides sufficient support to hold the glass on edge at the level of the upper surface of the spaced wall members. Each support bears a small part of the glass weight to minimize both bottom edge distortion and the effect on edge compression stress and adjacent composite tension stress that results from the bottom edge support by a solid member during thermal treatment when the glass is heated to above its strain point and later cooled to below its strain point.

The present invention will be understood more clearly in the light of a description of an illustrative embodiment thereof which follows.

In the drawings which form part of the illustrative embodiment and wherein like reference numerals refer to like structural elements, FIG. 1 is a perspective view of a glass supporting structure constructed according to the present invention;

FIG. 4 is an assembly view of the end of a furnace, a glass shaping station, and a cooling station disposed in end-to-end relation.

Figure 1:
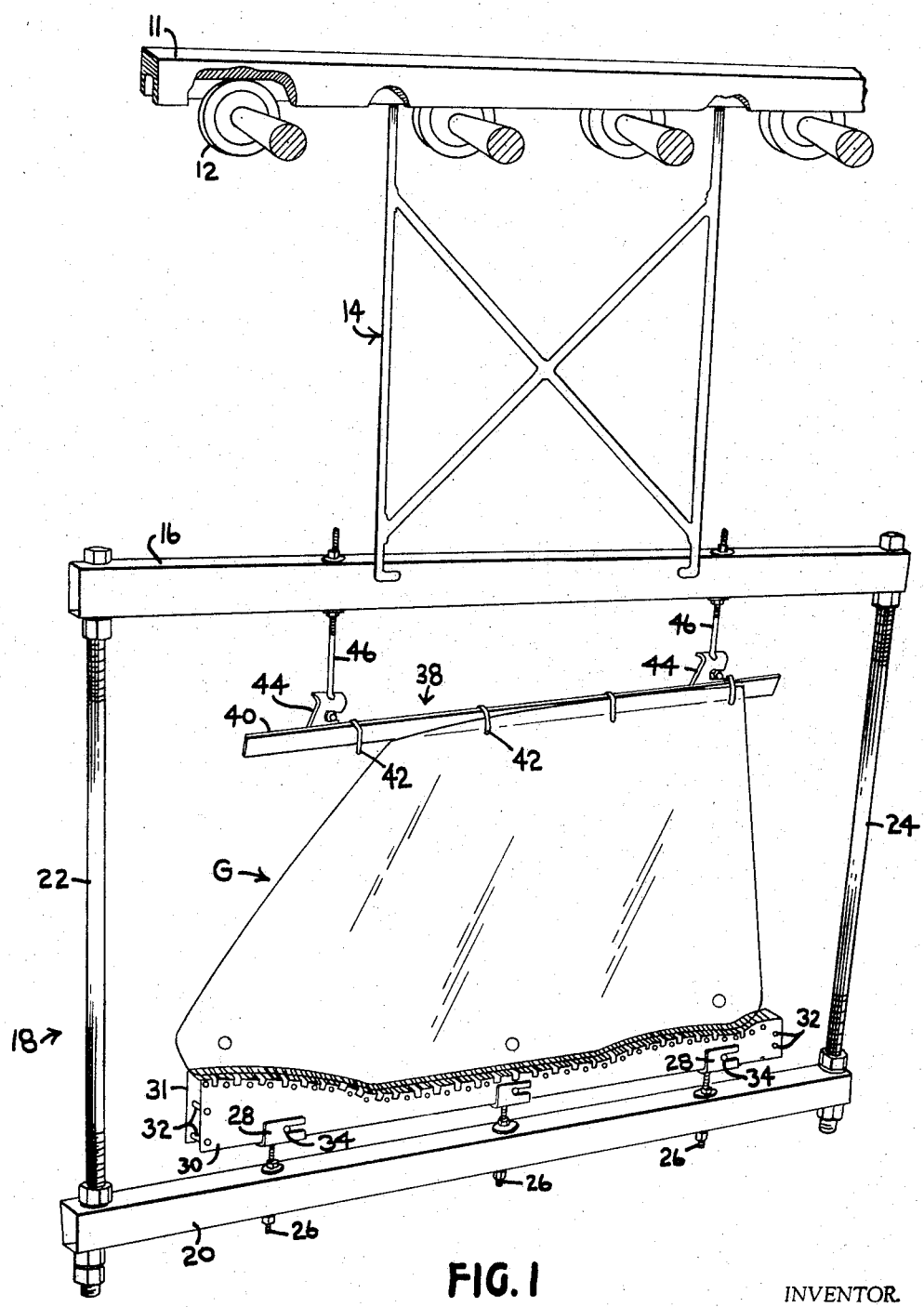
Figure 2:
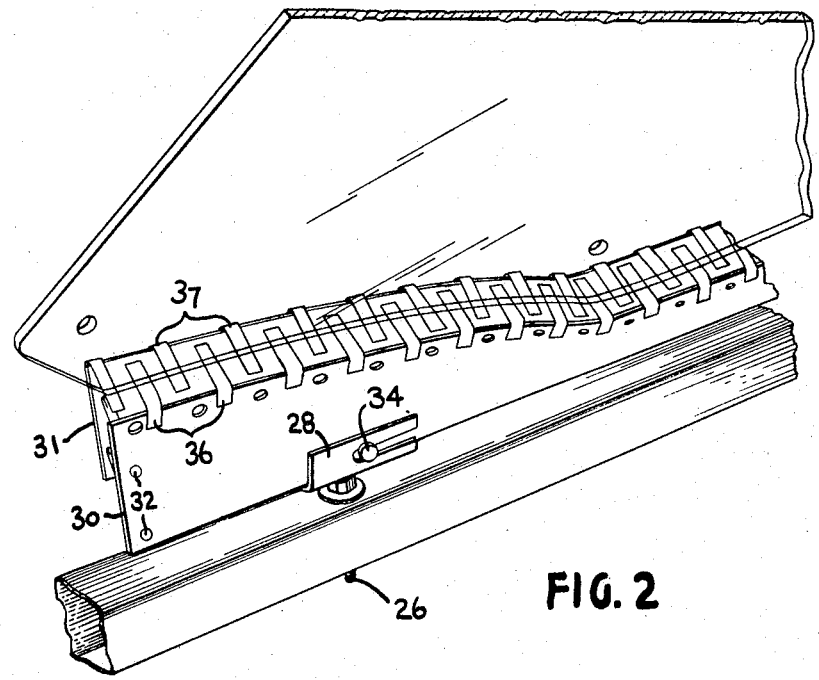
FIG. 2 is an enlarged view of a portion of the bottom edge supporting elements of the present invention.

The apparatus shown in FIG. 1 comprises an upper inverted channel member 11 resting on stub rolls 12 and propelled along a horizontal path of a conveyor as the rolls 12 are rotated in unison. The glass supporting structure includes a depending frame structure 14 that extends downward from its upper portion, the upper inverted channel member 11, to its lower portion, attached to an upper horizontal member 16 of a substantially rectangular frame 18. The frame structure thus provides a rigid connection between the frame 18 and the inverted channel.

The frame 18 includes, in addition to the upper horizontal member 16, a lower horizontal member 20. Vertical members 22 and 24 are connected at their ends to horizontal members 16 and 20.

The upper and lower horizontal members 16 and 20 are preferably rectangular tubes having apertures in their upper and lower walls to receive the upper and lower end portions of the vertical members 22 and 24. The latter may comprise rods which are externally threaded at their lower and upper ends to receive lock nuts to rigidly attach the upper and lower horizontal members 16 and 20 to one another to form the open rectangular frame 18. The latter provides a frame support for the glass supporting structure.

The lower horizontal member 20 is apertured to receive additional threaded rods 26. The threaded rods 26 support a series of slotted brackets 28. The latter support a pair of elongated vertical wall members 30 and 31 in spaced relation above the lower horizontal member 20 of the rectangular frame 18. The elongated wall members 30 and 31 are located in spaced vertical planes and are identical shape with one another and aligned with one another along their entire length. Elongated wall members 30 and 31 have a straight bottom edge resting on the series of slotted brackets 28 and are interconnected by spacing elements 32 at their longitudinal extremities and intermediate spacing elements 34 that extend through the slots of the slotted brackets 28. The spacing elements maintain the horizontally extending elongated wall members 30 and 31 separated from one another at a fixed distance, preferably about 1¼ inches.

The pair of elongated wall members 30 and 31 serve as rigid supports for the ends of flexible metal fingers 36 and 37, alternately attached to wall members 30 and 31. respectively. The fingers 36 and 37 extend transversely from one of the pair of elongated members toward the other. The flexible fingers are preferably made of flexible strips of stainless steel, such as type 302 or type 304. In the illustrative embodiment, the small strips of ribbon are approximately ¼ inch wide and have a maximum thickness of .050 inch (18 gauge metal).

The flexible fingers should have a minimum thickness consistent with their ability to provide support for the bottom edge of the glass sheet. Thus, the thickness and the height of the glass being treated are factors which determine the thickness required for the flexible finger supports.

The flexible fingers 36 and 37 are spaced apart distances approximately equal to their width. In the particular embodiment disclosed, alternate fingers 36 were attached at one end to the outer wall of one of the elongated walls 30 and fingers 37 to the other elongated wall member 31. Each successive finger extended more than half the distance from its attached elongated wall member toward the other elongated wall member.

The upper edges of the members 30 and 31 were formed to correspond to the shape of the bottom edge surface of the glass sheet to be supported. The nonlinear bottom edge of the glass was supported by the overlapping portions of flexible fingers 36 and 37.

The apparatus also comprises balancing means 38 such as an oblique metal bar 40 extending longitudinally in a horizontal direction in an oblique plane above the location of the flexible fingers 36 and 37. Spaced, metal pins 42 are attached at their upper ends to the upper end of the oblique bar 40 and extend downward in divergent relation to the oblique bar 40. At the upper edge of a glass sheet G supported on the apparatus, the fingers 42 are separated from the oblique bar 40 by a distance greater than the glass thickness. This enables the upper edge of the glass sheet to be in contact with the oblique bar 40 while the sheet is slanted slightly toward the bar 40 with its bottom edge supported by the flexible fingers 36 and 37 during the heating phase of the operation and to be pivoted to the other side of the vertical plane of support passing through its bottom edge to contact the spaced pins 42 in spaced relation to the oblique bar 40 when the glass is cooled following its heating operation.

The oblique bar 40 and the pins 42 are attached to the upper horizontal member 16 in spaced relation thereto by brackets 44 each having a rod externally threaded at its upper margin to be locked in positive relation to the upper horizontal member 16 by means of lock nuts. Both the upper horizontal member 16 and the lower horizontal member 20 of the substantially rectangular frame 18 are of hollow rectangular tubing sufficient to provide the rigidity for the rectangular frame, yet light enough to minimize the thermal capactiy of the glass supporting structure so as to minimize the amount of heat that would be selectively absorbed by the glass supporting structure rather than by the glass during the heating operation.

It is also understood that the glass sheet may be held upright by means other than the balancing device described above. For example, moving fluid may be used to balance the glass in a vertical plane while supported on its lower non-linear edge.

Referring now to FIG. 4, a rectangular frame 18 is shown in a tunnel-like furnace 47, and another frame shown in a glass shaping station 48. The tunnel-like furnace is provided with conventional heating elements (not shown) along both its side walls in order to heat the glass sheets G supported on the glass supporting structure of the present invention. An exit door 49 is located at the discharge end of the furnace.

Figure 3:
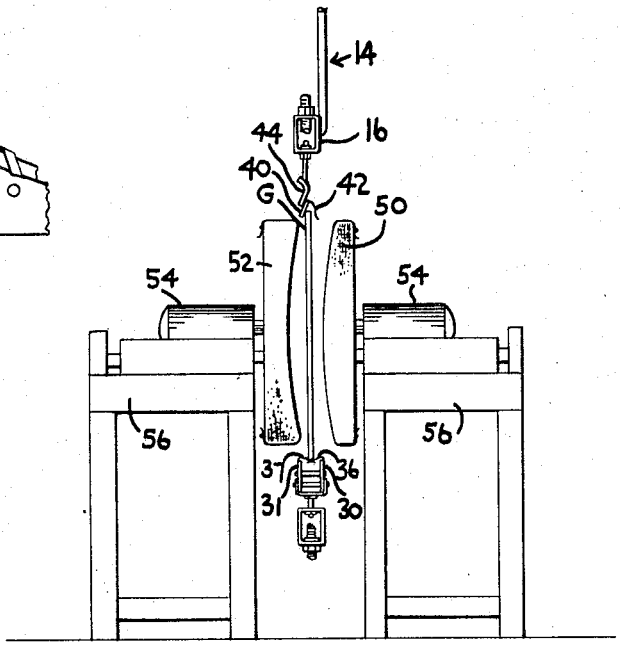
FIG. 3 is an end view of a glass shaping station showing how the bottom edge of the glass sheet is supported preparatory to its being shaped.

The glass shaping station 48, shown in end elevation in FIG. 3, comprises a pair of glass shaping members such as a member 50 having a convex shaping surface and a member 52 having a concave shaping surface. The concave shaping surface of the glass shaping member 52 is substantially complementary to that of glass shaping member 50. Any difference in shape is necessary to provide for the average thickness of glass sheets undergoing bending. The glass shaping members are preferably covered with a material that does not mar the surface of the glass undergoing shaping, such as knit fiber glass cloth. The shaping members are actuated toward and away from one another by pistons enclosed in piston chambers 54 supported on stands 56.

A glass cooling station 60 is located beyond the shaping station 48. A pair of plenum chambers 62 and 64 having nozzle openings, such as the nozzle openings 66 shown for plenum chamber 62, are disposed in spaced vertical planes on opposite sides of the path taken by the substantially vertically disposed glass sheets through the tunnel-like furnace 47, the glass shaping station 48, and the cooling station 60. The plenum chambers may be moved in spaced orbital paths in vertical planes flanking the vertical plane intersecting the path of movement provided for the glass by the conveyor by a cam connection 68 to a motor 70.

In a typical operation, glass sheets were introduced serially supported on the glass support structure disclosed herein. Each sheet was heated for a period of about 4½ minutes until its surface temperature as measured by a thermosensitive temperature measuring device, attained a reading between 1215 and 1225 degrees Fahrenheit. After the glass was removed from the furnace and shaped, it was cooled by applying 3½ ounces per square inch pressure against the concave surface and 4 ounces per square inch against the convex surface through plenum orifices spaced 5 inches apart and equidistant from the path of movement.

While the use of spaced flat flexible fingers as support for the bottom edge improved the optical properties of the supported edge and made possible support of curved edge glass sheets having a curved bottom edge, the relative merits of the present bottom edge support was compared with those provided by expanded metal and wire screen supports used previously. Rectangular plates of glass 13½ inches high by 24 inches long and having ¼ inch nominal thickness were used for this study.

Eighteen glass plates of the size and thickness indicated were tested in three different supports made of type 304 stainless steel. One set of 6 sheets was supported on bottom edge supports of type 304 expanded stainless steel, .047 inch thick with 50 percent open area. Another 6 glass sheets were supported on 5½ by 5½ mesh .054 inch wire diameter of type 304 stainless steel having 49.6 percent open area. A third set of 6 glass sheets was supported on flexible finger supports made of 18 gauge (.050 inch thick) type 304 stainless steel strips ¼ inch wide with a ¼ inch spacing to get 50 percent open area along the bottom edge of the glass. The vertical edges of the glass which were not in contact with any metal developed an average compressive stress of 10,500 pounds per square inch with an interior maximum composite tension stress of 1,200 pounds per square inch measured through the glass thickness interior of its edge. The following table shows that the flexible finger type of support provided less change in stress distribution than the other types of support tested compared to an exposed edge. Thus, the strength of the edges of glass sheets supported on the flexible finger supports was better than that of the edges supported on prior art structures. The average for the six readings of each type of support is recorded in the following table.

TABLE I

| Type of Support | Average of Edge Compression Stress (Pounds per Square Inch) | Average of Maximum Composite Tension Stress (Pounds per Square Inch) |
| --- | --- | --- |
| Expanded Metal | 7,113 | 2,640 |
| Wire Screen | 6,398 | 2,643 |
| Flexible Fingers | 8,421 | 1,566 |
| None | 10,500 | 1,200 |

The above experiment determined that the flexible fingers of the type employed in the present invention produced the strongest edges of those tested.

Figure 5:
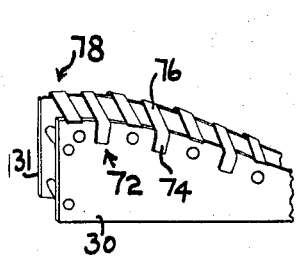
FIG. 5 is a fragmentary view similar to FIG. 2 of an alternate embodiment of the present invention.

In the alternate embodiment disclosed in FIG. 5, fingers 72 are shown with a vertical end portion 74 spot-welded to the outer side wall of elongated wall member 30 and a horizontal portion 76 extending completely across and slidably supported on the upper edge of the elongated wall member 31. The alternate fingers 78 have a vertical portion (not shown) spot-welded to the outer surface of elongated wall member 31 and have a horizontal portion 80 extending completely across to the upper surface of elongated member 30 on which they are slidably supported.

The form of the invention described in this disclosure represents an illustrative preferred embodiment and a modification thereof. It is understood that various changes may be made without departing from the spirit of the invention as defined in the claimed subject matter which follows.

What is claimed is:

1. Apparatus for supporting a rigid sheet in a substantially vertical plane comprising a pair of elongated wall members spaced transversely from one another along their length, a first set of flat, flexible fingers attached at their outer ends to one of said elongated wall members and extending more than half the transverse distance toward the other of said elongated wall members, a second plurality of flat, flexible fingers attached at their outer ends to the other of said elongated wall members and extending more than half the transverse distance toward said one elongated wall member, said fingers having unattached inner ends and being spaced substantially equal distances from one another longitudinally of said elongated wall members and oriented with their flat surfaces facing upward to support the lower edge portion of a rigid sheet and means for balancing the rigid sheet in an upright position.

2. Apparatus for supporting a rigid sheet having an irregular edge on said irregular edge in a substantially vertical plane comprising a pair of elongated wall members spaced transversely from one another along their lengths, said elongated wall members having upper edges formed to conform to said irregular edge of said rigid sheet, a first set of flat flexible fingers attached at their outer ends to one of said elongated wall members and extending more than half the transverse distance toward said other elongated wall member, a second plurality of flat, flexible fingers attached at their outer ends to the other of said elongated wall members and extending more than half the transverse distance toward said one elongated wall member, said fingers having unattached inner ends and being spaced substantially equal distances from one another longitudinally of said elongated members and oriented with their flat surfaces facing upward to support the lower edge portion of a rigid sheet and means for balancing the rigid sheet in an upright position.

3. In apparatus for tempering glass sheets comprising a tunnel-like furnace, a pair of spaced plenums having spaced openings facing inward, a conveyor for transporting glass sheets successively through said furnace and between said spaced openings, a plurality of carriages for supporting glass sheets in a substantially vertical plane for movement along said conveyor, each carriage comprising a pair of elongated wall members spaced transversely from one another along their length, a first set of flat, flexible fingers attached at their outer ends to one of said elongated members and extending more than half the transverse distance toward said other elongated member, a second plurality of flat, flexible fingers attached at their outer ends to the other of said elongated members and extending more than half the transverse distance toward said one elongated member, said fingers having unattached inner ends and being spaced substantially equal distances from one another longitudinally of said elongated wall members and oriented with their flat surfaces facing upward to support the lower edge portion of a rigid sheet and means for balancing said glass sheets in an upright position.

4. In apparatus as in claim 3 for bending and tempering glass sheets, a glass shaping station disposed intermediate said furnace and said pair of spaced plenums, said glass shaping station comprising a pair of glass shaping members having complementary convex and concave shaping surfaces and means to move said glass shaping members into pressurized engagement against the opposite surfaces of a hot glass sheet when the latter leaves said furnace.

5. In apparatus for tempering glass sheets having an irregular edge comprising a tunnel-like furnace, a pair of spaced plenums having spaced openings facing inward, a conveyor for transporting glass sheets successively through said furnace and between said spaced plenum openings, a plurality of carriages for supporting glass sheets in a substantially vertical plane for movement along said conveyor, each carriage comprising a pair of elongated wall members spaced transversely from one another along their length, said elongated wall members having upper edges formed to conform to said irregular edge of said rigid sheet, a first set of flat, flexible fingers attached at their outer ends to one of said elongated wall members and extending more than half the transverse distance toward said other elongated wall member, a second plurality of flat, flexible fingers attached at their outer ends to the other of said elongated wall members and extending more than half the transverse distance toward said one elongated wall member, said fingers having unattached inner ends and being spaced substantially equal distances from one another longitudinally of said elongated wall members and oriented with their flat surfaces facing upward to support the lower edge portion of a rigid sheet, and means for balancing the glass sheets in an upright position.

6. Apparatus for supporting a glass sheet having a nonlinear edge in an upright position with its nonlinear edge forming the supported bottom edge comprising a pair of elongated wall members transversely spaced from one another and having aligned upper edge surfaces formed thereon conforming generally to the shape of said nonlinear edge, a plurality of flexible flat metal strips supported in spaced relation by the upper edge of at least one of said elongated wall members, said metal strips having the minimum thickness needed to support said glass sheet along said nonlinear edge but not exceeding .050 inch, the upper surfaces of said flat metal strips forming a discontinuous nonlinear edge supporting surface intermediate said wall members and generally parallel to said aligned upper edge surfaces formed thereon, wherein each said flexible flat metal strips are rigidly attached to one of said elongated wall members and slidably supported on the upper edge surface formed on the other elongated wall member.

References Cited
UNITED STATES PATENTS 3,298,809   1/1967   Barch et al. _____ 65—287

FOREIGN PATENTS 734,153   4/1943   Germany.

S. LEON BASHORE, *Acting Primary Examiner.*

DONALL H. SYLVESTER, *Examiner.*

A. D. KELLOGG, *Assistant Examiner.*